Jan. 24, 1950         W. E. CELLWORK         2,495,671
APPARATUS FOR DISPENSING VISCOSE FLUIDS
Filed Dec. 18, 1944
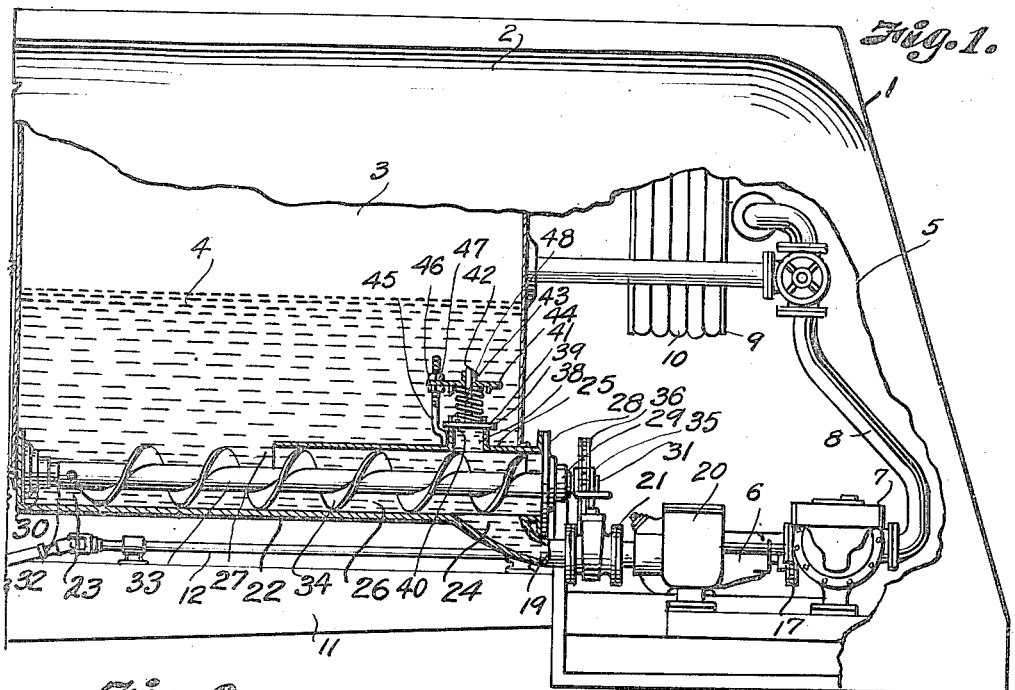
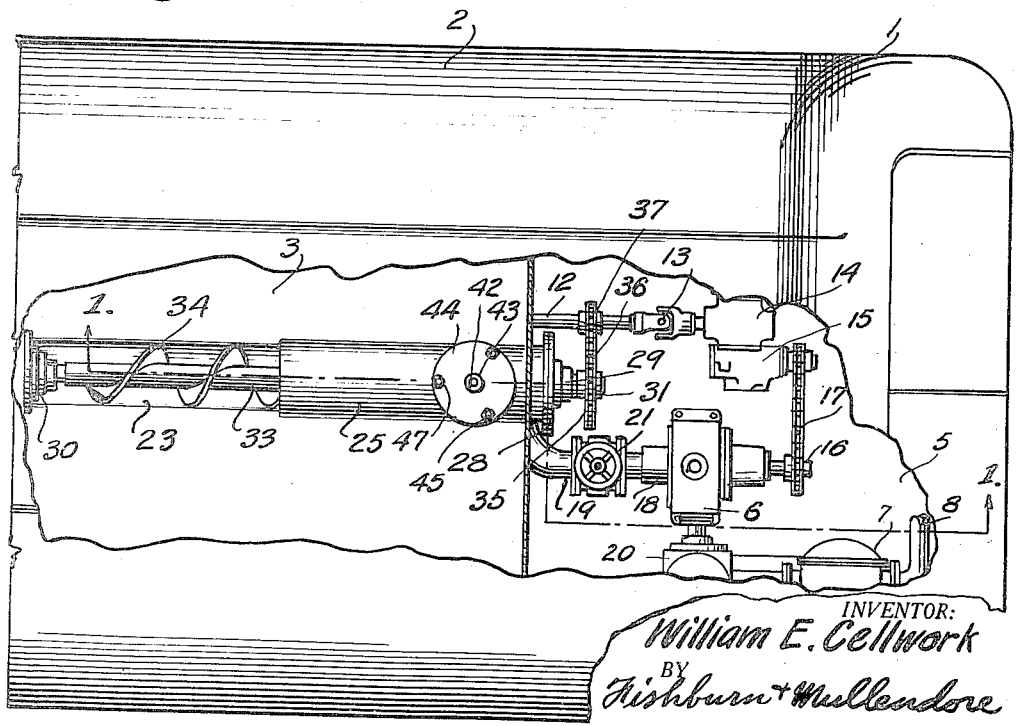
INVENTOR:
William E. Cellwork
BY
Fishburn + Mullendore
ATTORNEYS.

Patented Jan. 24, 1950

2,495,671

UNITED STATES PATENT OFFICE 2,495,671

APPARATUS FOR DISPENSING VISCOSE FLUIDS

William E. Cellwork, Kansas City, Mo., assignor to Standard Steel Works, North Kansas City, Mo., a corporation of Missouri Application December 18, 1944, Serial No. 568,611

7 Claims. (Cl. 222—252)

This invention relates to apparatus for dispensing vicose fluids that are difficult to flow at low temperatures; for example, when reoilers are used in servicing aircraft with lubricating oil in cold climates, the oil, particularly after standing, becomes so stiff that it will not flow in a satisfactory manner to the dispensing pump.

It is, therefore, the principal objects of the present invention to provide apparatus of this character with positive means for initially stirring the oil after standing to increase the fluidity thereof, and to provide means for positively feeding the oil to the inlet of the dispensing pump.

Other objects of the invention are to provide an apparatus which is relatively simple and which may be operated by the power used to operate the dispensing pump.

In accomplishing these and other objects of the invention, I have provided improved details of structure, the preferred form of which is illustrated in the accompanying drawing wherein:

Fig. 1 is a side elevational view of the rear end of a reoiler unit, a portion of the tank wall being broken away to better illustrate the apparatus embodying the features of the present invention.

Fig. 2 is a plan view showing the top of the unit broken away to illustrate the dispensing apparatus.

Referring more in detail to the drawings:

1 designates a reoiler unit such as used in servicing aircraft and the like and with which fresh lubricating oil is delivered to the engines. The units of this character usually include a tank 2 having a compartment 3 therein for containing a body of lubricating oil 4 and having a rear compartment 5 for containing the dispensing pump 6, meters 7, oil transfer ducts 8, and the reeling equipment 9 whereon a hose 10 is stored for conveying the dispensed lubricating oil. The tank 2 is mounted on the chassis 11 of a motor vehicle. The pump 6 is driven from a power take-off of the vehicle by means of a longitudinal shaft 12. The shaft 12 extends rearwardly under the tank and into the rear compartment 5 where it connects through a universal joint 13 with a power take-off 14 adapted to drive a suitable transmission 15 whereby the pump may be operated at desired speeds. The transmission 15 is connected with the driving shaft 16 of the pump by a chain and sprocket connection as indicated at 17. The inlet 18 of the pump is connected with an outlet duct 19 having connection with the bottom of the storage compartment 3 and the discharge connection 19 of the pump is connected with the usual oil straining and measuring equipment generally designated 20 from where the oil is delivered through the duct 8 to the hose 10, flow of oil to the pump being under control of a shut-off valve 21 located in the discharge connection 19 as best shown in Fig. 1.

The apparatus thus far described is conventional of a lubricant servicing apparatus and operates satisfactorily except under vicose conditions of the lubricating oil as, for example, when the oil stands for a considerable period in the compartment 3 and particularly when the oil is subject to relatively cold atmospheric conditions, in which cases the oil becomes so stiff and vicose that it will not flow in a satisfactory manner through the connection 19 to the pump.

The present invention, therefore, contemplates mechanical means for reducing viscosity of the oil contained in the storage compartment and to effect forced movement of the oil to the inlet of the pump so that the pump is effective in dispensing the oil by way of the hose 10. In accomplishing this purpose, the bottom 22 of the tank is provided with a depending trough-like channel 23 which may be coextensive with the compartment 3 and which has the rear end thereof connected with the discharge connection 19 through a port 24. The channel 23 is of substantially semi-circular cross section and the rear portion adjacent the port 24 cooperates with a substantially semi-cylindrical cover 25 to form a cylindrical duct 26, the forward end of which directly connects with the compartment 3 through the space 27 afforded by the uncovered portion of the channel as best illustrated in Fig. 2. The duct projects through the rear wall of the compartment 3, into the compartment 5 and is closed by a cover plate 28 having an axial bearing 29 therein. The bearing 29 cooperates with a similar bearing 30 carried at the forward end of the trough-like channel to journal the respective ends 31 and 32 of a shaft 33, the shaft 33 being provided with a spiral blade 34 which extends substantially the full length of the channel, the forward flights of which are open to the oil in the compartment 3 and the rear flights are arranged to rotate within the duct 26 with the peripheries thereof in close contact with the walls of the duct as shown in Fig. 1 whereby when the shaft is rotated the oil is moved by the forward flights into the duct and moved by the rear flights through the duct in the direction of the port 24.

The conveyor shaft 33 projects through the bearing 29 and carries a sprocket wheel 35 which is driven by a chain 36 operating over a sprocket 37 on the shaft 12 as best shown in Fig. 2. Thus, when the power take-off is operated to rotate the shaft 12, the spiral conveyor is operated to effect movement of the oil.

In order to release the oil when the valve 21 is closed and to effect stirring of the oil in the compartment 3 to reduce the vicosity thereof, the duct 25 is provided within the compartment with an upwardly opening outlet port 38 formed within a collar 39 carried by the cover 25 and which forms an angular seat 40 for a valve member 41. The valve member 41 includes a stem 42 having its upper and reciprocably mounted on threaded posts 45 carried by the collar 38, the plate being adjustably supported on the post by jamb nuts 46 and 47 engaging the respective sides thereof as best shown in Fig. 1.

In order to retain the valve seated under predetermined pressures built up within the duct 25 so as to force the oil into the pump when the valve 21 is open, I provide a spring 48 having one end seated against the valve and the other end against the side of the plate 44 as shown in Fig. 1, the action of the spring being regulated to suit desires by adjusted position of the plate 44 on the threaded posts 45.

In operating a reoiler unit constructed as described and assuming that the oil has stood for a considerable period in the compartment 3 or has become chilled so that it is difficult to flow to the intake of the pump, the power take-off is actuated to rotate the shaft 12 which in turn drives the spiral conveyor shaft 33 to cause circulation of the viscose oil in the compartment 3 into the opening 27 for movement through the duct 25 whereupon sufficient pressure is built up in the duct to cause opening of the valve plate 41 and release of the oil into the compartment 3.

It is thus obvious that a continuous circulation of the oil may be maintained in the compartment 3 to increase the fluidity thereof so that when the valve 21 is opened and the pump 6 operated by the transmission 15, the oil is in condition to be readily delivered into the inlet of the pump by the positive action of the spiral conveyor forcing the oil through the port 19. When the valve 21 is open and the fluidity of the oil has been increased so it flows freely through the pump, the valve plate will seat under pressure of the spring; however, any surplus oil which cannot be accommodated by the pump will effect building up of sufficient pressure to cause opening of the valve plate and the surplus is returned to the tank 3 for recirculation simultaneously with flow of oil to the pump.

From the foregoing it is obvious that I have provided a reoiling unit with a simple mechanical mechanism to increase fluidity of the oil and promote free flow thereof to the dispensing pump.

It is also obvious that I have provided for positive feed of the oil from the storage compartment of a reoiler unit to the intake of the pump whereby viscose oil and oils made viscose are readily dispensed by the pump and accurately measured for supply to aircraft and like equipment which is necessary to be serviced with lubricating oil in cold climates.

What I claim and desire to secure by Letters Patent is:

1. In an apparatus of the character described, a container, a trough in the bottom of the container, means covering a portion of the trough within the container for forming a duct and having an outlet located in said container, a pump connected with the duct, a spiral conveyor rotatable in the trough and extending into the duct for moving a viscose material from the container to the pump, and bypass means connected with the outlet in the duct and located completely within the container for discharge directly into the body of viscose material adapted to be carried in the container.

2. In an apparatus of the character described, a container, a trough in the bottom of the container, means covering a portion of the trough within the container for forming a duct and having an outlet located in said container, a pump connected with the duct, a spiral conveyor rotatable in the trough for moving a viscose material from the container into the duct for delivery to the pump, bypass means connected with the outlet in the duct and located completely within the container for discharging material directly into the body of viscose material adapted to be carried in the container, and a spring loaded valve controlling the bypass means.

3. In an apparatus of the character described, a container for carrying viscose material, a duct in the container for discharge of material from the container, a pump connected with the discharge end of the duct, a spiral conveyor rotatable in the duct for moving viscose material into the duct for delivery to the pump, a collar encircling an outlet opening in a portion of the duct within said container for forming a discharge connection directly into the body of viscose material to be carried in the container, a valve seating on the collar, a stem for the valve, a guide for the valve, adjustable means supporting the guide relative to the duct, and a spring inserted between the valve and said guide for loading the valve to release material from the duct through said connection at a predetermined pressure of the material in said duct.

4. In an apparatus of the character described, a container for carrying viscose material, a trough in the bottom of the container, means covering a portion of the trough within the container for forming a duct in said container, a pump connected with the duct, a spiral conveyor rotatable in the trough for moving a viscose material into the duct for delivery to the pump, a collar encircling an outlet opening in the duct for forming a discharge connection directly into the viscose material to be carried in the container, a valve seating on the collar, a stem for the valve, a guide for the valve, adjustable means supporting the guide relative to the duct, and a spring inserted between the valve and said guide for loading the valve to release material from the duct through said connection at a predetermined pressure of the material in said duct.

5. In an apparatus of the character described, a container for viscose material and having an outlet for said material, a pump connected with the outlet, propulsion means in the container for moving material through the outlet from a point in the container spaced from said outlet to the pump, a valve in said connection, means for actuating the propulsion means at one speed, means for actuating the pump at a differential speed, and a spring loaded valve at the end of the propulsion means nearest the outlet and discharging directly into the container for bypassing material from the propulsion means back to the container for stirring material in the container when the valve is closed and when the pump is operating at speeds insufficient to handle material moved by the propulsion means.

6. In an apparatus of the character described, a container for a viscose material, a pump, propulsion means, a duct housing the propulsion means and having an inlet end opening into the container and an outlet connected with the pump, a valve for closing off flow from said duct through said pump, said duct having an outlet into the container at a point remote from the inlet, a spring pressed valve normally closing said outlet of the duct and adapted to open responsive to pressure effected by said propulsion means when said first-named valve is closed, and means for operating said propulsion means and said pump.

7. In an apparatus of the character described, a container for viscose material having an outlet for said material, a duct in the container connected with said outlet at one end of said duct and extending into the container to provide an inlet at the opposite end that is separated from said outlet, a pump connected with the outlet, propulsion means in the duct for removing material from the container by way of the inlet of said duct and through said duct to the outlet of the container, a valve in said pump connection, means for actuating the propulsion means, and valve means in said duct at the end which is connected with said outlet for bypassing material from the propulsion means back into the container at a point spaced from the inlet of said duct for stirring the material in the container when the valve in said connection is closed.

WILLIAM E. CELLWORK.

REFERENCES CITED

The following references are of record in the file of this patent:

UNITED STATES PATENTS

| Number | Name | Date |
|---|---|---|
| 1,113,381 | Thoma | Oct. 13, 1914 |
| 1,698,023 | Matthewson | Jan. 8, 1929 |
| 1,828,317 | Clapp | Oct. 20, 1931 |
| 1,859,290 | Davis | May 24, 1932 |
| 1,875,745 | Marland | Sept. 6, 1932 |
| 1,898,815 | Clapp | Feb. 21, 1933 |
| 1,930,293 | Valentine | Oct. 10, 1933 |
| 2,366,654 | Rotter | Jan. 2, 1945 |